(12) United States Patent
Chung

(10) Patent No.: US 6,209,859 B1
(45) Date of Patent: Apr. 3, 2001

(54) UNIVERSAL REFLOW FIXTURE

(76) Inventor: Henry Chung, 3478 Del Norte Dr., San Jose, CA (US) 95132

( * ) Notice: Subject to any disclaimer, the term of this patent is extended or adjusted under 35 U.S.C. 154(b) by 0 days.

(21) Appl. No.: 09/420,180

(22) Filed: Oct. 10, 1999

(51) Int. Cl.[7] .................................................. B25B 5/14
(52) U.S. Cl. ........................ 269/111; 269/121; 269/286; 269/903
(58) Field of Search .................................. 269/903, 121, 269/124, 125, 111, 118, 41, 42, 286; 228/47.1, 44.3

(56) References Cited

U.S. PATENT DOCUMENTS

| | | | | |
|---|---|---|---|---|
| 1,168,147 | * | 1/1916 | Bender | 269/111 |
| 3,392,972 | * | 7/1968 | Wing | 269/111 |
| 3,395,439 | * | 8/1968 | Palesi et al. | 269/903 |
| 4,030,717 | * | 6/1977 | Serlovsky | 269/118 |
| 4,332,366 | * | 6/1982 | Munt | 269/111 |
| 5,002,264 | * | 3/1991 | Nimtz | 269/41 |
| 5,161,789 | * | 11/1992 | Rogers | 269/42 |

* cited by examiner

*Primary Examiner*—Robert C. Watson
(74) *Attorney, Agent, or Firm*—Robert Samuel Smith

(57) ABSTRACT

A frame comprising four angles each angle having two legs, each leg connected to a a leg of a neighboring angle wherein locations of attachment of the legs are adjustable so as to accommodate a range of sizes of boards for a surface mount manufacturing process. One leg of each angle has a tongue and the other leg has a groove so that tongue of one leg slideably engages the groove of the leg of a neighboring angle to enable adjustment in size of the frame opening. The board is supported on a shoulder around the frame opening with the surface of the board opposite the supporting shoulder surface coplanar with the plane surface of the frame. A flat spring loaded rotatable finger on the plan surface in one corner of the board urges the board toward the opposite corner of the frame.

20 Claims, 3 Drawing Sheets

UNIVERSAL REFLOW FIXTURE

FIELD OF THE INVENTION

This invention relates to apparatus for assembling components on printed circuit boards (PCB) and particularly to a fixture that supports the board through manufacturing steps including soldering.

BACKGROUND AND INFORMATION DISCLOSURE

The technology for manufacturing circuits comprising components mounted on printed circuit boards has evolved continuously during the past fifty years keeping pace with the evolution of discrete semiconductor devices to present high density integrated circuits on a chip.

The first boards were simply plastic phenolic boards with printed wiring to which discrete components were hand soldered. As chips holding integrated circuits were developed, the technology of "plated-through-holes technology" appeared.

The dip is a chip imbedded in a plastic block enclosure generally about the size of a postage stamp. The block also contains leads extending from contact with the chip to outside the block so that the integrated circuit resembled a centipede including the block and one row of legs (legs) along one edge of the block opposite a second row of legs along an opposite edge.

The relentless demand for greater component density on the board and reduced cost led to the development of "Surface Mount Technology" which has either replaced or been used in combination with plated through hole technology. "Surface mounting" is the name of the process in which a packaged IC or other component is physically mounted on the surface of the PWB instead of inserting leads into plated holes through the PWB.

The steps in the method of the surface mount process (prior art) are described as follows:

In step 1, components (Integrated Circuits, capacitors, resistors, etc.) are provided in which the leads are short and "tucked" against the component or otherwise bent (during the manufacturing process) so that a relatively broad surface of each lead is turned in a common direction facing the surface of the printed wire board. The leads are pretinned.

In step 2, a plastic board is provided with a wire circuit printed on at least one side.

In step 3, the board is cleaned using one of several processes depending on the condition of the board i.e., degree of oxidation, etc.

In step 4, a "foot pad" pattern of patches is deposited on the board wherein each foot pad ultimately becomes an area to which a lead of a component is soldered. The foot pad is a patch of solder paste. The foot pad pattern is typically deposited by a screening method such as is used in printing processes.

In step 5, the components are placed at the required locations on the screen with each lead of the component in contact with the appropriate patch. This is commonly done with "pick and place" machines which is programmed to place the component in the exact required location on the board.

In step 6, the board with components is heated causing the solder paste to melt and then securely attach the lead to the solder patch (after, of course, the solder patch solidifies). Special heating techniques have been developed which offer advantages particularly for the solder reflow step in the surface mount process. One such process is vapor phase heating in which the board carrying the components for reflow are first preheated in a vaporous environment to one temperature for the purpose of eliminating thermal shock in a second step which is the step of a higher temperature vaporous environment. In the second step, the heated vapor condenses on the surface of solder paste because the solder paste is at a lower temperature when it is first inserted into the higher temperature chamber. When the vapor condenses on the board, the vapor gives up its heat of condensation to the solder and melts the solder.

A requirement for all of these processes is that each board must be supported as it is carried through the various steps from one process station to the next. This is generally accomplished in the industry by mounting the board on a support fixture. Because the requirements for each station varies, general practice is to provide a fixture that is designed for that specific station. Therefore, when the board is moved from one station to the next, it is placed on a fixture designed specifically for that station. This frequent transfer from one fixture to another is time consuming, subject to accidents or misalignments causing errors, introduces additional costs in terms of a requirement to provide more fixtures, provide storage space and accounting activity to keep track of the fixtures. Therefore there is strong interest in reducing the number of fixtures that are used throughout the process.

A particularly critical step is the stencil printing step where it is required to apply a squeegee to force the stencil into contact with the board and to repeat this operation many times (board after board). This step is made even more difficult when pressure is applied to the screen which stretches the screen each time the screen is used. Eventually the screen becomes permanently stretched so that registration between features is diminished leading to inaccuracies.

In the "pick and place" (of components) operation, the apparatus required to place the part would be less expensive if the board could simply slide horizontally into position under the placement head rather that having to include the step of withdrawing the head from the level of the surface of the board in order to avoid hitting the frame when the frame carrying the board is slid into position.

Another important expense is the requirement to have various sizes of fixturess—each size matching a size requirement for a board.

Another characteristic that determines the degree to which a fixture satisfies the requirements of all of the steps in the manufacturing process is the ability of the fixture to not become a heat sink during the solder reflow step and the ability of the fixture not to warp as a result of exposure to heat.

Another important requirement is to maintain precise registration in the placement of each component during the pick and place operation with respect to the screen printed pattern and this requirement is a major factor in determining the achieveable density in manufacturing the printed circuit.

A number of disclosures have appeared related to fixtures for manufacturing of printed circuit boards.

For example; U.S. Pat. No. 5,785,307 to Chung discloses a frame for supporting a printed circuit board. Spring loaded clamps are mounted around the area with fingers that may e oriented out over the area to retain the board. The board is released when the stool is rotated so as to orient the finger out of contact with the board.

Japanese Patent 2-153591 to Okuno discloses a method using conductive paste to repair a printed circuit board.

Japanese Patent 48238 to Seisakusho discloses a one touch security arrangement for securing a board to a table.

None of these inventions disclose a single board that addresses all of the problems discussed above.

SUMMARY

It is an object of the invention to provide a fixture on which is securely mounted a board that is carried through the various steps to manufacture a printed circuit that has certain important advantages compared to fixtures that are presently used for this purpose. These advantages include:

- being capable of supporting boards of various sizes during prining and "pick and place" and reflow operations.;
- minimizing heat loss due to conduction of heat into the fixture during the reflow step;
- minimizing warpage during the solder reflow step;
- minimizing the amount of stretch of the stencil during the stencil printing step;
- permitting that the board be positionable under a pick and place head by simply sliding the board without a requirement to first move the head away from the plane of the board in order to avoid interference with the frame, precise positioning of the board on the fixture in order to maintain registration of the printed pattern when it is required to transfer the fixture between operations.

This invention is directed toward a fixture for supporting a board during a printed circuit board manufacturing operation comprising a frame wherein the size of the opening of the frame is adjustable to accommodate a range of board sizes.

Supporting contact at the edges of the board are made by a scallop pattern on the inside edge of the frame so that contact by the frame to the edge of the board is a plurality of narrow line edges wherein each edge has a very small area of contact with the board thereby providing negligible loss of heat by conduction from the board.

The board is held firmly in precisely repeatable horizontal position by a spring loaded notched finger at an inside corner of the frame that biases the board against an opposite corner. The notched finger has an axis of rotation perpendicular to the board and no part of the finger extends above the surface of the board which would otherwise interfere with print or "pick and place" heads when the board is moved into position.

The fixture is machined from sheets of a fiberglass composition found by the inventor to be particularly effective in resisting warpage and degradation such as encountered in solder reflow operations.

DESCRIPTION OF PREFERRED EMBODIMENTS

Figure 1:
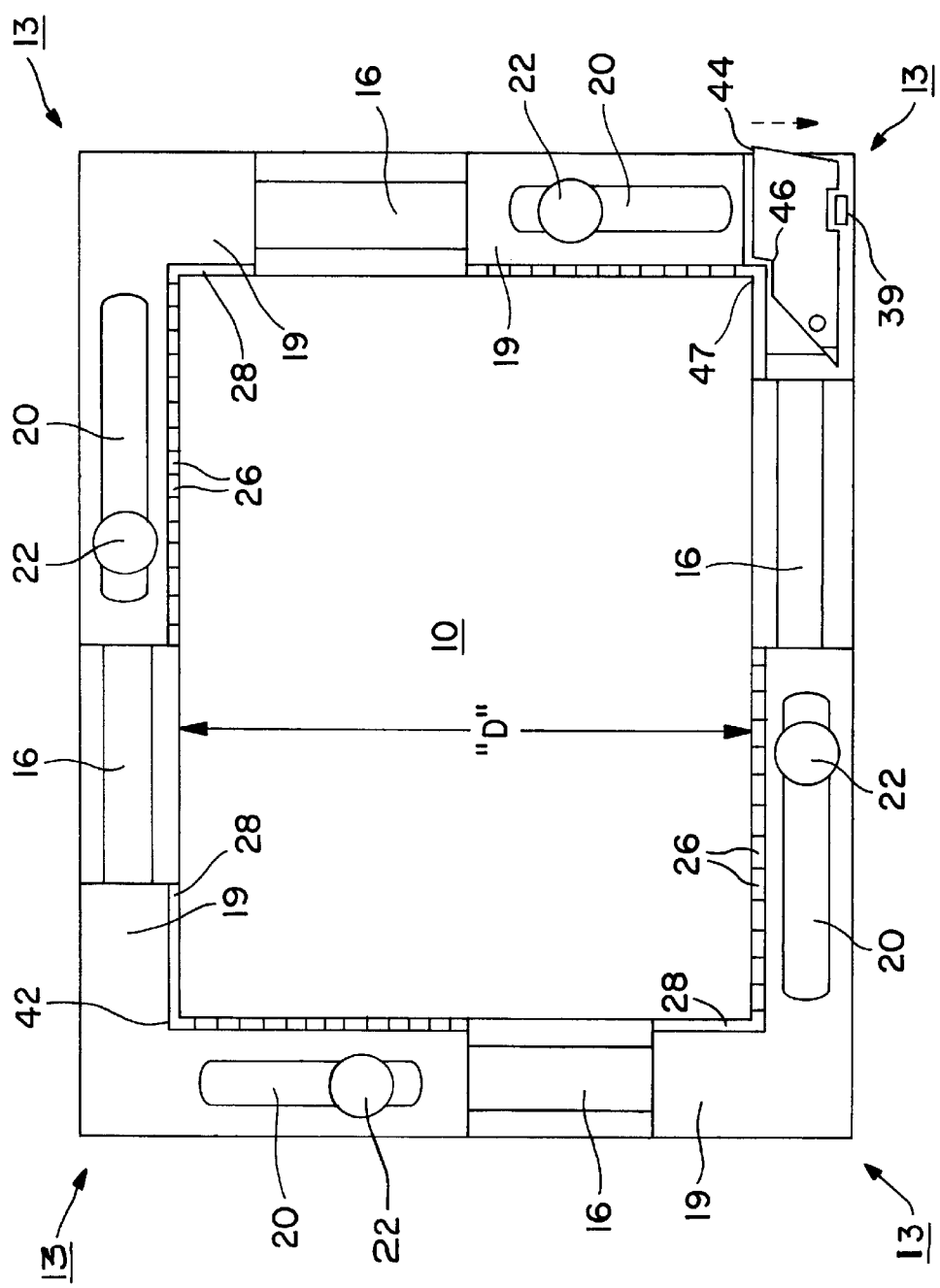
FIG. 1 is a plan view of the frame of this invention.

Turning now to a discussion of the drawings, FIG. 1 shows the plan surface of the assembled frame according to one embodiment of this invention. The frame comprises four rigid identical angles 13. Each angle 13 is shown in greater detail in the perspective view of FIG. 2. Each angle has a first leg 131 joined at one end to an end of the second leg 132. Leg 132 has an elongated groove 14 that slideably engages the tongue 16 on the extended end 18 of leg 131 of the adjoining angle 13. Leg 132 also has a slot 20 through which a set screw 22 is positioned and screwed into a threaded hole 24 in leg 131 of the neighboring angle 13. This feature permits adjusting the size"D" of the frame opening by sliding legs 131 over legs 132 and then clamping the legs in position by tightening set screws 22.

While the angles shown in the example of FIG. 1 are equal so that the four joined angles form a square, it will be understood that the lengths of the legs of tha angles may be selected to form a rectangle.

Figure 2:
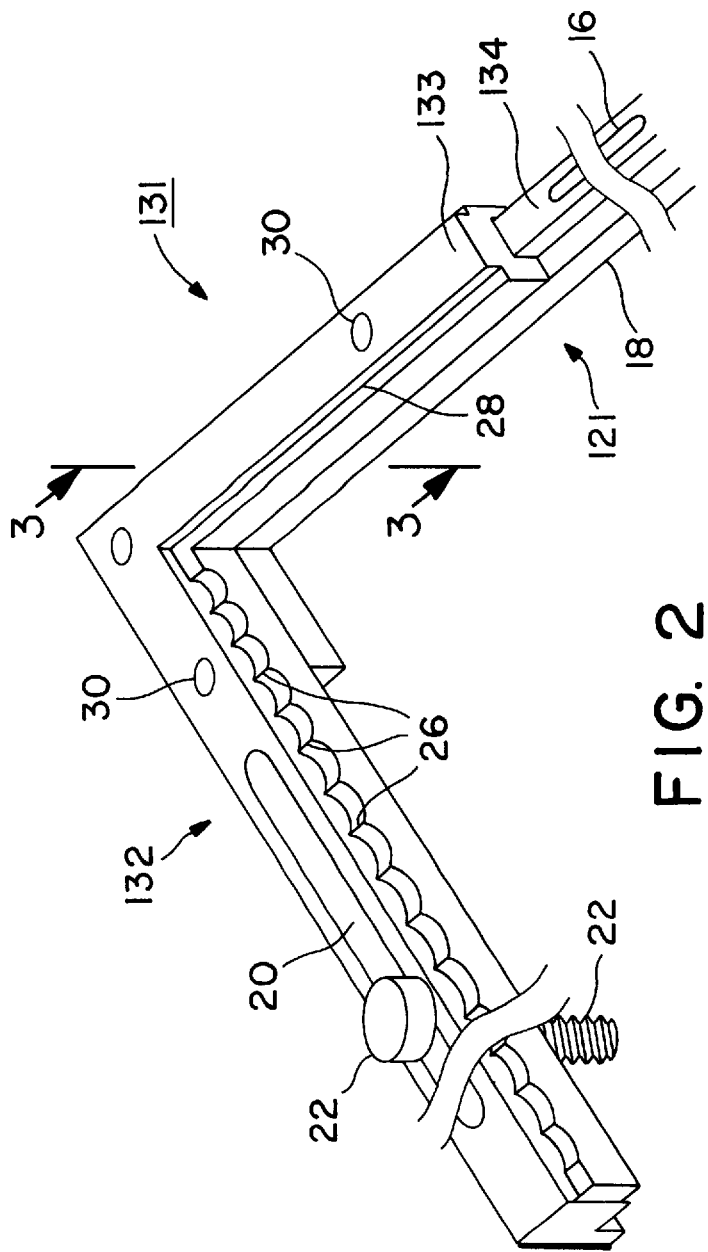
FIG. 2 is a perspective view of one angle of four angles that comprise the frame.
Figure 3:
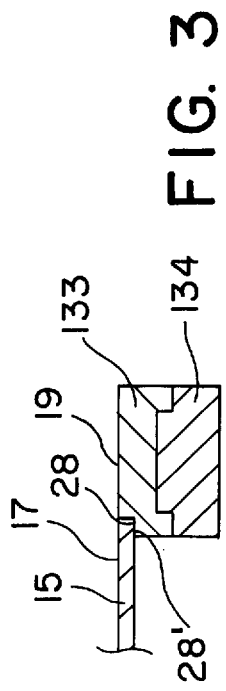
FIG. 3 is a sectional view showing the board in position on shoulder of the frame.

As shown in FIGS. 1–3, the board 15 is supported on a shoulder surface 28 including the tip edges 26 of the scalloped surface and shoulder of each angle. This arrangement in which the board sits on the tip edges 26 of the scalloped surface reduces escape of heat flowing from the board to the frame during the vapor reflow step and thereby improves the efficiency of the vapor reflow step performed to reflow the solder patches.

As seen in FIG. 3, the depth of the shoulder 28 and the tip edges 26 below plan surface 19 is selected so that the top surface 17 of the board 15 is coplanar with the plan surface 19 of the frame 10 so that the plan surface 19 of the fixture can be a reference plane for positioning the board for an automated screen printing operation in which vertical positioning of the board must be repetitive and reproducible as discussed in the BACKGROUND. This arrangement also reduces the problem of avoiding interference between the frame and "pick and place": heads as discussed above.

Figure 4:
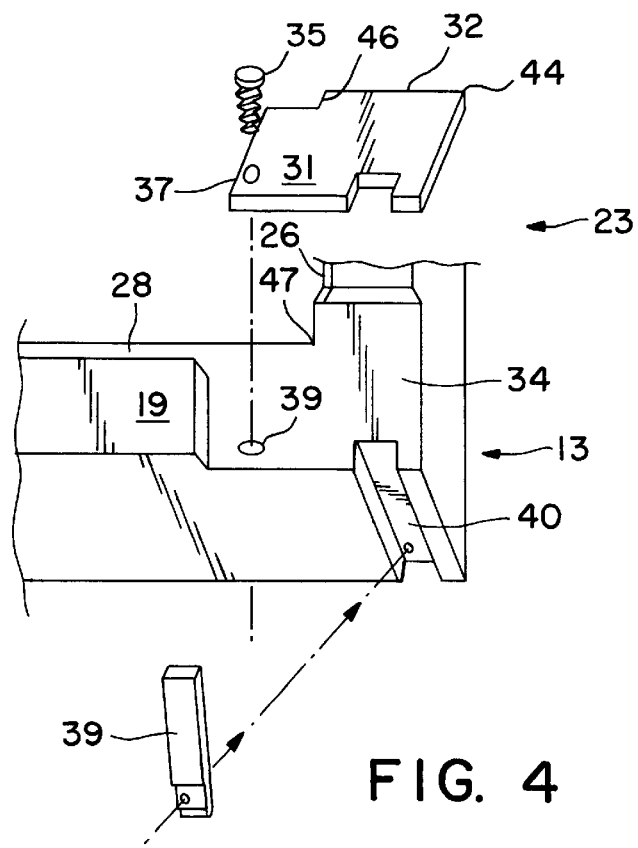
FIG. 4 is a perspective view showing details of the spring loaded finger securing the frame.

As shown in the assembly view of FIG. 1 and the exploded view of FIG. 4, a notched finger assembly 23 is mounted on the corner of one angle 13 of the frame 10 for detachably securing the board to the frame 10. The finger assembly 23 includes a flat finger plate that is pivotally mounted on a corner cutout 34 by a stud (e.g., a screw 35) through an aperture 37 in finger 32 and threaded into hole 39 of angle 13. In order to attach the board in position on the frame, the finger 32 is rotated by pressing corner 44 of the flat finger 32 in direction of arrow A shown in FIG. 1. This causes a notch 46 in finger 32 to move away from corner 47 so as to permit laying the board 15 onto shoulder 28 of the frame 10. When the finger is released, flat spring 39 biases the finger to turn in the opposite direction, the notch engages the corner of the board and the spring action forces the board against the opposite corner 42 (FIG. 1) of the frame 10. Each board placed successively in the frame is thereby registered repetitively and precisely with the frame.

The cutout forming flat depressed area 34 in angle 13 provides that, when the flat finger 32 is pivotally secured to the frame, the major (top) surface 31 of the finger 32 is coplanar with the top surface 17 of the board 15 and the plan surface 19 of the frame. Therefore, there is no interference of the finger 32 with the manufacturing apparatus as the board is slid into position adjacent to (e.g.) a screening squeegee or pick and place head.

Figure 5:
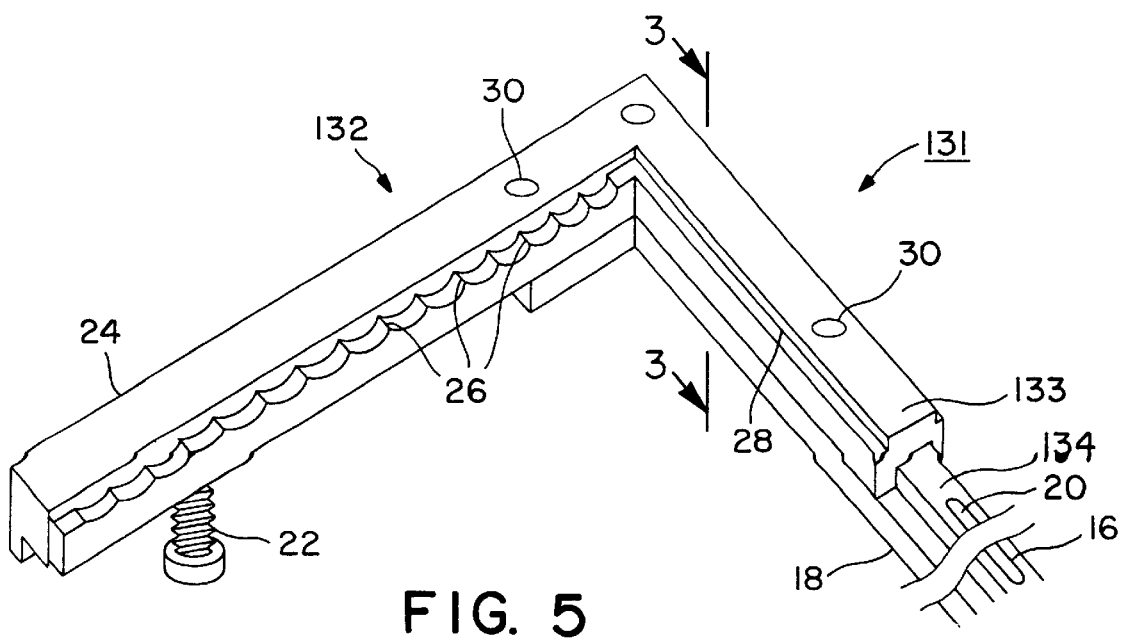
FIG. 5 shows an arrangement of the frame permitting printing.

FIG. 5 shows a preferred embodiment, in which each angle 13 is shown to comprise an upper section 133 bolted securely to a lower section 134 by bolts (three are shown). This construction of each angle is an easier fabrication job than trying to manufacture the leg from one piece of stock.

The frame going through the surface mount process is subject to temperatures that may exceed 300° C. Depending on the application, the frame may be constructed from metallic or nonmetallic material or parts of the frame may be constructed from metallic or nonmetallic material. In order to reduce heat flow which is particularly important in a vapor solder reflow operation, a preferred material for construction of the frame is a fiber glass-thermosetting machinable composition. Fixtures made according to the preferred embodiments made with a suitable material identified by the tradename Durastone are available from KA tool and Supply Inc., Milpitas, Calif. When parts of the frame are advantageously made of metal, then the preferred metal is aluminum because aluminum does not tend to be wetted by molten solder.

There has been described a frame for supporting a printed circuit board through the steps of the printing and reflow process. The construction of the frame presents minimum interference as it is moved between stations and inherently provides accurate registration of the board with the frame. The tongue and groove construction permits adjustments which accommodate various board sizes and yet retains a sturdiness that is required for its application in the manufacturing process.

Variations and modifications of the invention may be suggested by reading the specification and studying the drawings that are within the scope of the prior art.

For example, FIG. 5 shows the slot 20 in leg 131 so that the head of bolt 22, screwed through the slot 20 into leg 132 is on the opposite side of the board supported on surface 28. This arrangement permits that the frame may be used in both a reflow operation and in a printing operation.

I therefore wish to define the scope of my invention by the appended claims.

I claim:

1. A rectangular frame for supporting a board in a surface-mount-manufacturing operation of a printed circuit board which comprises:

four angles, each angle having an elongated first leg member and an elongated second leg member with an end of said first end member joined perpendicularly to an end of said second member;

means for securing said first leg member of each of said four angles against and parallel to said second leg member of a neighboring angle operably arranged to form said frame having a rectangular opening;

said frame having a plan surface on one side of said frame with a shoulder (28) having a shoulder surface around said frame opening operably arranged to support said board on said shoulder surface;

means for adjusting location of said first leg member of each said angle relative to location of said second leg of said neighboring angle according to a preselected size of said rectangular opening;

said first leg of each angle having a surface with one of a tongue and a groove and said second leg of each angle having a surface with one of a groove and a tongue respectively arranged with said one of said tongue and groove of said first leg of each angle slideably engaging said groove and tongue of said neighboring second leg in operable combination to permit adjusting said rectangular opening to said preselected size whereby location of said first leg member of each said angle is adjustable relative to location of said second leg of said neighboring angle according to a preselected size of said rectangular opening.

2. The frame of claim 1 wherein said means for securing said first leg member parallel to and against said second leg member of said neighboring angle comprises:

four bolts, one said bolt for each said angle;

each said first leg having an elongated slot through said first leg, and each said second leg having a threaded hole arranged in operable combination with said slot to provide that said bolt extended through said slot and screwed into said threaded hole secures said first leg member of said respective angle to said second leg member of said neighboring angle.

3. The frame of claim 1 wherein a depth of said shoulder is equal to a thickness of said board providing that when said board is positioned in said frame and supported on said shoulder, a top surface of said board is coplanar with said plan surface of said frame.

4. The frame of claim 3 wherein said shoulder has a section of shoulder surface (26) that is scalloped.

5. The frame of claim 1 which comprises means for securing said board supported by said shoulder surface in said frame.

6. The frame of claim 5 wherein said means for securing said board comprises:

said plan surface (19) having a flat depressed area (34) located proximal to one corner of said frame;

a flat finger (32) having a major surface (31) and mounted in said depressed area (34) to rotate about an axis perpendicular to said major surface (31), said area (34) and said plan surface 19;

said flat finger having an edge with a notch arranged to be rotatable against said board with said notch engaging a corner of said board supported on said shoulder surface (281);

spring means for biasing said flat finger to rotate against said corner of said board and push said board toward a corner of said frame opposite said one corner of said frame.

7. The frame of claim 6 wherein said spring means comprises a flat spring having one end secured to a side of said frame adjacent said depressed area and having another end biased against said flat finger operably arranged to urge said flat finger to rotate with said notch toward said board.

8. The frame of claim 1 wherein said frame is constructed from a metal.

9. The frame of claim 1 wherein said frame is constructed from a non metal.

10. The frame of claim 9 wherein said non metal is glass fiber impregnated with a binder.

11. The frame of claim 10 wherein said binder is selected to withstand a temperature of 350° C.

12. A rectangular frame for supporting a board in a surface mount manufacturing operation of a printed circuit board which comprises:

four angles, each angle having an elongated first leg member and an elongated second leg member with an end of said first leg member joined perpendicularly to an end of said second leg member;

means for securing said first leg member of each of said four angles against and parallel to said second leg member of a neighboring angle operably arranged to form said frame having a rectangular opening;

said frame having a plan surface with a shoulder (28) having a shoulder surface (281) around said frame opening operably arranged to support said board on said shoulder surface with a top surface (17) of said board coplanar with said plan surface (19) of said frame;

said first leg of each angle having a surface with one of a tongue and a groove and said second leg of each angle having a surface with one of a groove and a tongue respectively arranged with said one of said tongue and groove of said first leg of each angle slideably engaging said one of groove and tongue of said neighboring second leg in operable combination to permit adjusting a preselected size of said rectangular opening;

four bolts, one bolt for each said angle;

each said first leg having an elongated slot through said first leg, and each said second leg having a threaded hole arranged in operable combination with said said slot to provide that, when said first and second legs are located to form said preselected size, one of said four bolts extended through said slot and screwed into said threaded hole secures said first leg member of said respective angle to said second leg member of said neighboring angle.

13. The frame of claim 12 wherein a depth of said shoulder is equal to a thickness of said board providing that when said board is positioned in said frame and supported on said shoulder, a top surface of said board is coplanar with said plan surface of said frame.

14. The frame of claim 13 wherein said shoulder has a section of shoulder surface (26) that is scalloped.

15. The frame of claim 13 comprising:

said plan surface (19) having a flat depressed area (34) located proximal to one corner of said frame;

a flat finger (32) having a major surface (31) and mounted in said depressed area (34) to rotate about an axis perpendicular to said major surface (31), said area (34) and said plan surface (19);

said flat finger having an edge with a notch arranged to be rotatable against said board with said notch engaging a corner of said board when said board is supported on said shoulder surface (281);

spring means for biasing said flat finger to rotate against a board positioned on said shoulder surface and push said board toward a corner of said frame opposite said one corner of said frame;

a flat spring having one end secured to a side of said frame adjacent said depressed area and having another end biased against said flat finger operably arranged to urge said flat finger to rotate with said notch toward said corner of said frame opposite said one corner of said frame and engaging a corner of said board when said board is supported on said shoulder.

16. The frame of claim 15 wherein said frame is constructed from a metal.

17. The frame of claim 15 wherein said fame is constructed from a non metal.

18. The frame of claim 17 wherein said non metal is glass fiber impregnated with a binder.

19. A pallet for supporting a board in a surface-mount-manufacturing operation of a printed circuit board which comprises:

a rectangular frame having a plan surface and surrounding a rectangular opening;

a shoulder formed in said frame around said opening dimensioned to support edges of said board over said opening with a top surface of the board coplanar with said planar surface;

said plan surface (19) having a flat depressed area (34) located proximal to one corner of said frame;

a flat finger (32) having a major surface (31) and mounted in said depressed area (34) to rotate about an axis perpendicular to said major surface (31), said area (34) and said plan surface (19);

said flat finger having an edge with a notch arranged to be rotatable against said board with said notch engaging a corner of said board when said board is supported on said shoulder surface (281);

spring means for biasing said flat finger to rotate against a board positioned on said shoulder surface and push said board toward a corner of said frame opposite said one corner of said frame;

a flat spring having one end secured to a side of said frame adjacent said depressed area and having another end biased against said flat finger operably arranged to urge said flat finger to rotate with said notch toward said corner of said frame opposite said one corner of said frame and engaging a corner of said board when said board is supported on said shoulder.

20. The frame of claim 17 wherein said non metal is glass fiber impregnated with a binder.

* * * * *